(12) United States Patent  
Robinson

(10) Patent No.: US 9,831,922 B1  
(45) Date of Patent: Nov. 28, 2017

(54) SYSTEM AND METHOD FOR DETERMINING TREAD WEAR OF A TIRE

(71) Applicant: NXP B.V., Eindhoven (NL)

(72) Inventor: Robert Lindsay Robinson, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/351,760

(22) Filed: Nov. 15, 2016

(51) Int. Cl.  
    *H04B 5/00*     (2006.01)  
    *G01M 17/02*     (2006.01)  
    *B60C 11/24*     (2006.01)  
    *B60C 19/00*     (2006.01)

(52) U.S. Cl.  
    CPC .......... *H04B 5/0043* (2013.01); *B60C 11/243* (2013.01); *B60C 11/246* (2013.01); *G01M 17/02* (2013.01); *B60C 2019/004* (2013.01)

(58) Field of Classification Search  
    CPC ..... B60C 11/243; B60C 11/246; B60C 11/24; B60C 23/0422; B60C 23/0416; B60C 23/0488; B60C 23/0489; B60C 23/0433; H04B 5/0043  
    USPC ........... 340/442, 447, 539.23, 686.1; 73/146, 73/146.5; 116/34 R; 701/29  
    See application file for complete search history.

(56) References Cited

U.S. PATENT DOCUMENTS

| | | | |
|---|---|---|---|
| 9,649,896 B1* | 5/2017 | Lin | B60C 23/0464 |
| 2005/0192727 A1* | 9/2005 | Shostak | B60C 11/24 |
| | | | 701/37 |
| 2008/0084285 A1 | 4/2008 | Bhogal et al. | |
| 2014/0150543 A1* | 6/2014 | Shima | B60C 23/0416 |
| | | | 73/146 |
| 2014/0172241 A1* | 6/2014 | Shima | B60C 23/0416 |
| | | | 701/49 |
| 2014/0360256 A1 | 12/2014 | Orlewski | |
| 2016/0075189 A1 | 3/2016 | Engel et al. | |
| 2016/0114632 A1* | 4/2016 | Hellerud | B62D 61/00 |
| | | | 280/63 |

OTHER PUBLICATIONS

Continental Corporation; "Continental In-Tire Sensors Read Tread Depth"; Press Release: 2 pages (Mar. 8, 2016).  
Gentner, Philipp K. et al; "Accurate Measurement of Power Transfer to an RFID Tag with On-chip Antenna"; PIERS Proceedings, Moscow, Russia; pp. 216-219 (Aug. 19-23, 2012).

(Continued)

*Primary Examiner* — Hung T Nguyen  
(74) *Attorney, Agent, or Firm* — Charlene R. Jacobsen

(57) ABSTRACT

A system for determining tread wear of a tire includes a first wireless communication chip located at an inner surface of the tire and a second wireless communication chip located at an outer surface of the tire. The second chip resides in a slot extending through a housing located in a groove in a tread of the tire. The second chip moves in the slot toward the bottom of the groove in response to the tread wear. Methodology entails transmitting a first signal from a first chip, receiving the first signal at the second chip, transmitting a second signal from the second chip in response to receipt of the first signal, receiving the second signal at the first chip, computing a time delay between transmission of the first signal and receipt of the second signal, and determining tread wear of the tire in response to the time delay.

20 Claims, 6 Drawing Sheets

(56) References Cited

OTHER PUBLICATIONS

I & A tyre Press; "Bridgestone develops CAIS-based tyre wear sensor"; retrieved from the Internet www.tyrepress.com/2014/12/bridgestone-develops-cais-based-tyre-wear-sensor/; 1 page (Dec. 17, 2014).

Translogik; iProbe+ The Ultimate integrated tyre inspection tool: Wireless tread depth, tyre pressure & RFID reader; retrieved from the Internet http://www.trans-logik.com/products/iprobe.html; 6 pages (Nov. 8, 2016).

* cited by examiner

US 9,831,922 B1

SYSTEM AND METHOD FOR DETERMINING TREAD WEAR OF A TIRE

TECHNICAL FIELD OF THE INVENTION

The present invention relates generally to determining tread wear of a tire. More specifically, the present invention relates to a system and method for real-time determination of tread wear of a tire.

BACKGROUND OF THE INVENTION

Tires are formed with a tread that makes contact with the road or ground. Grooves in the tread of the tire, typically referred to as the tread pattern, are designed to provide traction, especially in adverse weather. For example, the grooves may be designed to allow water to be expelled from beneath the tire so as to prevent hydroplaning. As a tire is used, the tread is worn down, thereby reducing the groove depth and limiting its effectiveness in providing traction.

As such, it is important to monitor the tread wear of tires as well as characterize the type of tread wear. Characterization of tread wear of vehicular tires can reveal uneven wear between tires, indicating that a rotation of tires may be needed. Further, uneven wear on one tire may indicate that the vehicle has a suspension problem. Still further, uniform wear of all tires could indicate that the tread has worn down thereby compromising their effectiveness in providing traction and/or increasing the probability of having a tire blowout when a vehicle is in motion.

Accordingly, vehicle owners need to monitor the tread wear by visual check and/or by direct measurement of tread depth to ensure that the tread depth is sufficient for safe driving. Unfortunately, the responsibility for monitoring tread wear may be neglected, leading to tires being utilized after the end of their service life. Driving on tires that are past their service life can unnecessarily place the vehicle driver and passengers in a dangerous driving situation.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns a system and method for determining tread wear of a tire. More particularly, the inventive concepts and principles embodied in the system and method enable real time, automatic, and wireless measurement and characterization of the tread wear of the tires on a vehicle. Accordingly, a driver can be alerted to changes in tread depth and can therefore get replacement tires before a legal minimum safe tread depth is reached. Additionally, individual variations of tread depth between tires and/or between individual grooves in the tread of a tire can be measured and characterized to identify when the tires may need to be rotated and/or when there may be a problem that is causing undue wear in the tread of one tire versus the remaining tires.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements from one another.

Figure 1:
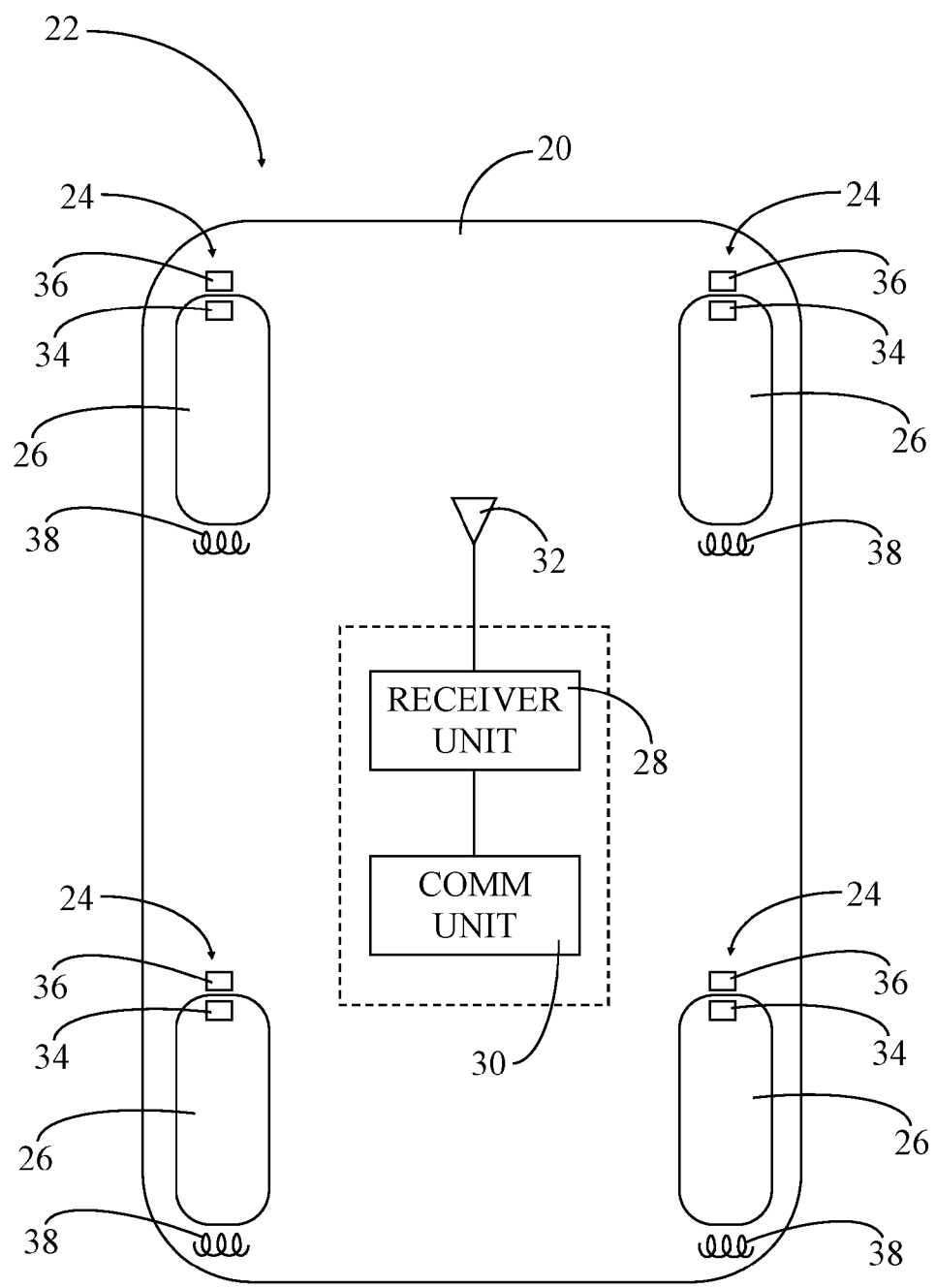
FIG. 1 shows in a simplified and representative form a vehicle including a tread wear determination system in accordance with an embodiment.

Referring to FIG. 1, FIG. 1 shows in a simplified and representative form a vehicle 20 including a tread wear determination system 22 in accordance with an embodiment. Tread wear determination system 22 includes multiple measurement systems 24, one each of measurement systems 24 being attached to one each of four tires 26 of vehicle 20. Although a vehicle with four tires is shown herein, it should be understood that tread wear determination system 22 implemented on a vehicle with fewer than or more than four tires may include a quantity of measurement systems 24 commensurate with the quantity of tires. Vehicle 20 is represented herein as being an automobile. It should be understood, however, that vehicle 20 could be any land-based vehicle having tires, an airplane having tires designed to land on a runway or the ground, or any of wide variety of motorized and non-motorized vehicles having tires that are subject to tread wear.

Tread wear determination system 22 further includes a receiver unit 28 and a communication unit 30 coupled with receiver unit 28. In some embodiments, receiver unit 28 may be in wireless communication with each of measurement systems 24 via an antenna system 32. In other embodiments, each of measurement systems 24 may be physically or wirelessly in communication with another sensor unit located within tires 26 such as, for example, a tire pressure monitoring system. In such a configuration, the tire pressure monitoring system may be adapted to communicate data between measurement system 24 and receiver unit 28.

Further, in some embodiments, receiver unit 28 and communication unit 30 may be located within vehicle 20 so that communication unit 30 can communicate information regarding the tread wear of tires 26 to a driver of vehicle 20 (discussed below). In other embodiments, receiver unit 28 and communication unit 30 may be a separate hand-held device that may be internal or external to vehicle 20, such as the driver's mobile phone, a specialized tool held by a mechanic, and the like.

Each of measurement systems 24 includes a polling circuit 34 and a polled chip 36. A coil element 38 may provide a radio frequency (RF) signal for powering polling circuit 34 and polled chip 36 in accordance with known techniques. The term "poll" refers generally to making an inquiry or sampling a status of a device. Accordingly, as used herein the term "polling circuit" refers to the component of measurement system 24 that transmits a poll signal, i.e., an inquiry signal. The "polled chip" refers to the component of measurement system 24 that receives and responds to the poll signal. In accordance with an embodiment, polling circuit 34 transmits a first (i.e., poll) signal to polled chip 36. Upon receipt of the first signal, polled chip 36 transmits a second (i.e., response) signal. As will be discussed in significantly greater detail below, a time delay between transmission of the first signal and receipt of the second signal at polling circuit 34 can be used to determine tread wear of tire 26 associated with the particular measurement system 24.

Figure 2:
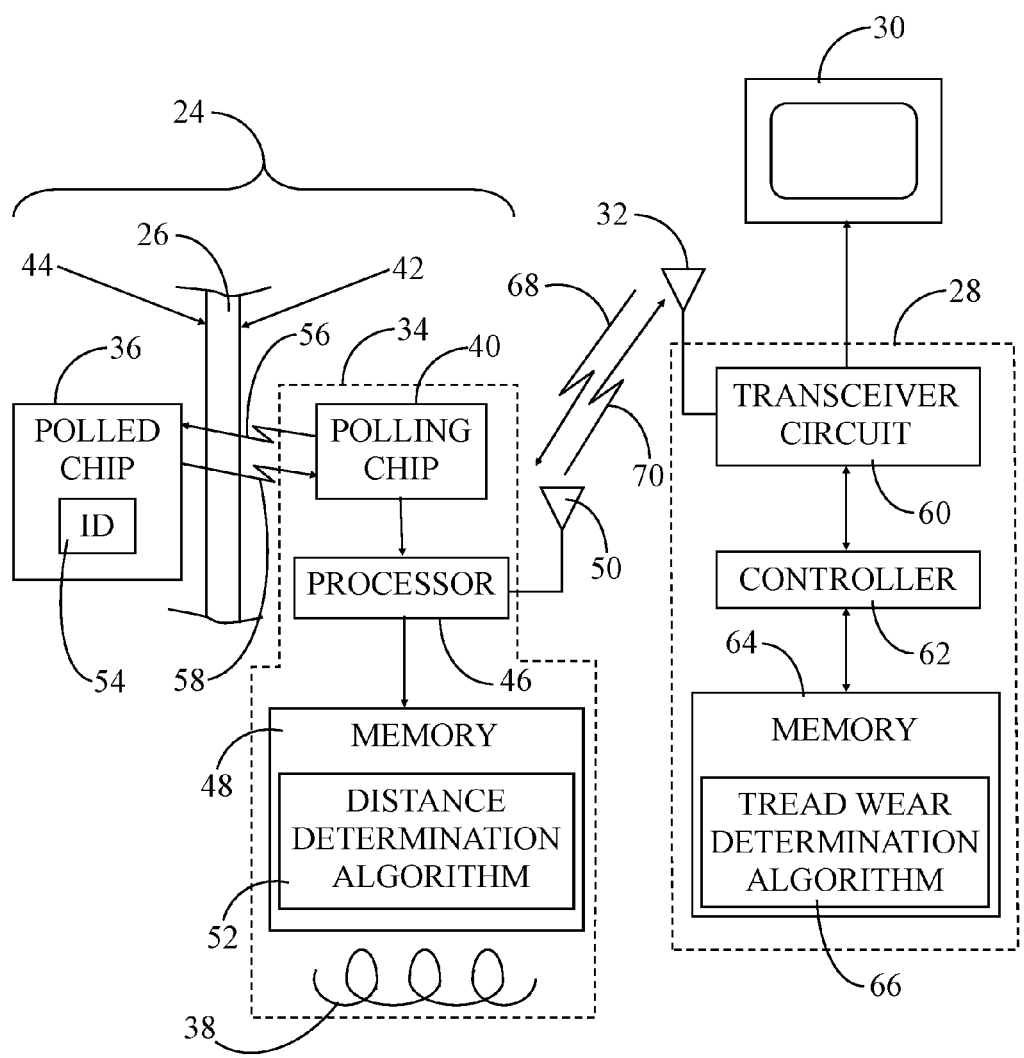
FIG. 2 shows a simplified block diagram of tread wear determination system.

FIG. 2 shows a simplified block diagram of tread wear determination system 22. A single measurement system 24 including polling circuit 34, polled chip 36, and coil element 38 is shown in the block diagram of FIG. 2 for simplicity of illustration. However, it should be understood that tread wear determination system 22 includes multiple measurement systems 24 corresponding to the quantity of tires 26 on vehicle 20 (FIG. 1). Thus, the ensuing description of measurement system 24 applies equivalently to each of the multiple measurement systems 24 of tread wear determination system 22.

Polling circuit 34 includes a first wireless communication chip, referred to herein as a polling chip 40, located at an inner surface 42 of tire 26. Polled chip 36, as a second wireless communication chip, is located at an outer surface 44 of tire 26. Polling circuit 34 further includes a processor element 46 associated with polling chip 40. A memory element 48 and an antenna 50 may be coupled with processor element 46. A distance determination algorithm 52 may be stored in memory element 48 and is executable by processor element 46. In some embodiments, polling chip 40 may be embedded in a housing (not shown) which is coupled to inner surface 42 of tire 26 with processor element 46, memory element 48, and antenna 50 being located in a housing (not shown) separate from polling chip 40. In other embodiments, polling chip 40, processor element 46, memory element 48, and antenna 50 may be located in a common housing coupled to inner surface 42 of tire 26. On the other hand, polled chip 36 resides in a housing (not shown) located at outer surface 44 of tire 26 that will be discussed particularly in connection with FIGS. 3-5.

Polling chip 40 may include a microchip that is attached to an antenna (not shown). Likewise, polled chip 36 may include a microchip that is attached to an antenna (not shown). Polled chip 36 is a wireless communication device, i.e., a transponder, capable of receiving and automatically responding to an incoming signal. Polled chip 36 stores information in the form of, for example, a unique identifier 54 that is transmitted wirelessly in an automated fashion to polling chip 40. In an example, polling chip 40 may continually or periodically poll the polled chip 36. Polled chip 36 may be a passive, near-field communication (NFC) chip or an ultra-high frequency (UHF) chip capable of receiving a first signal, i.e., a polling signal 56, from polling chip 40 and transmitting a second signal, i.e., a response signal 58, that contains unique identifier 54. Polling chip 40 is enabled to receive response signal 58 containing unique identifier 54 from polled chip 36.

Upon receipt of response signal 58, processor 46 (executing distance determination algorithm 52) computes a time delay between transmission of polling signal 56 and receipt of response signal 58 at polling chip 40. As wear of the tread advances, polled chip 36 at outer surface 44 of tire 26 moves closer to polling chip 40 at inner surface 42 of tire 26 (discussed below). Accordingly, the time delay will decrease corresponding to the magnitude of tread wear. As such, this time delay is indicative of tread wear of tire 26.

Receiver unit 28 includes a transceiver circuit 60 coupled to antenna system 32, a controller 62 in communication with transceiver circuit 60, and a memory element 64 accessible by controller 62 and having a tread wear determination algorithm 66 stored therein. In some embodiments, controller 62, executing tread wear determination algorithm 66, transmits a radio frequency (RF) command signal 68 via transceiver circuit 60 and antenna system 32 to initiate execution of distance determination algorithm 52 at measurement system 24. In response to the execution of distance determination algorithm 52, polling circuit 34 transmits an RF tread wear state signal 70 (indicative of tread wear of tire 26) to controller 62 via antenna system 32 and transceiver circuit 60.

Controller 62 may receive multiple tread wear state signals 70 from the multiple measurement systems 24 associated with tires 24. Controller 62 may then characterize the magnitude of the tread wear on each tire. In some configurations, the magnitude of the tread wear may be compared to a wear threshold level. If the magnitude of the tread wear is less than the wear threshold level, the controller executing tread wear determination algorithm 66 initiates certain actions. These actions may include providing a visual and/or audible notification to the driver via communication unit 30. For example, notifications to the driver may include a visual alert such as a warning light or a message on an in-vehicle display unit specifying which tire or tires need to be replaced. Alternatively, a buzzer or voice system may be used to specify which tire or tires need to be replaced. Other notifications can include notification of uneven tread wear on one tire or between multiple tires, saving the current distance measurement in a database in association with its particular tire 26, assessing the severity of the tread wear, notifying a service facility, notifying a central fleet dispatch, and so forth.

Figure 3:
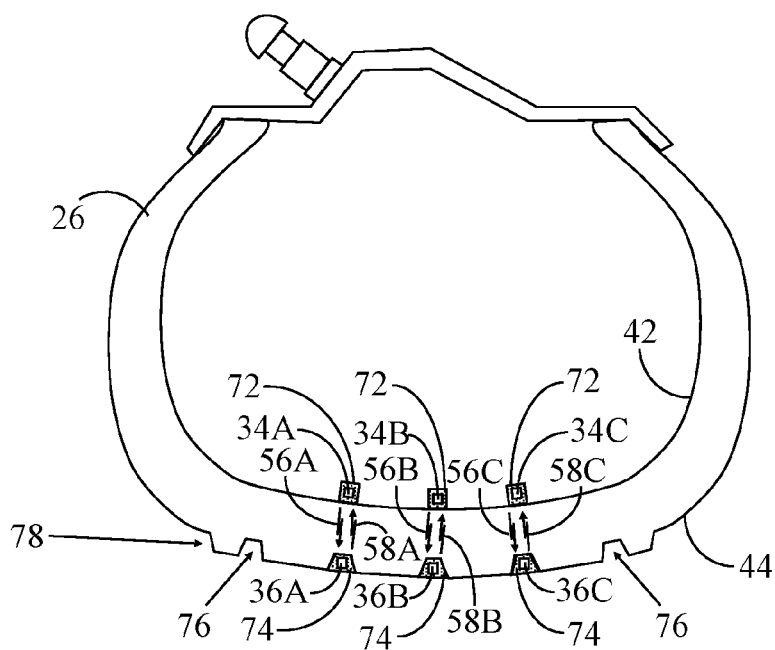
FIG. 3 shows a cross sectional view of a tire having multiple polling circuits and polled chips of the tread wear determination system in accordance with an embodiment.

FIG. 3 shows a cross sectional view of one of tires 26 having multiple polling circuits 34A, 34B, 34C and multiple polled chips 36A, 36B, 36C of tread wear determination system 22 (FIG. 2) in accordance with an embodiment. Each polling circuit 34A, 34B, 34C, which includes polling chip 40 (FIG. 2), is embedded in a housing 72, with housing 72 being coupled to inner surface 42 of tire 26. Each polled chip 36A, 36B, 36C also resides in a housing 74, with housing 74 being coupled to outer surface 44 of tire 26. More particularly, housing 74 is configured to reside in a groove 76 in a tread 78 of tire 26. Housings 72, 74 are represented by blocks having a stippled shading, and circuits 34 and chips 36 are represented by white rectangles within housings 72, 74, for simplicity.

Polling circuits 34A, 34B, 34C and polled chips 36A, 36B, 36C are in stacked alignment with one another on inner and outer surfaces 42, 44 of tire 26. That is, polling circuits 34A, 34B, 34C and polled chips 36A, 36B, 36C lie in a one-to-one relationship directly across from one another on inner and outer surfaces 42, 44 of tire 26. In this configuration, each polling circuit 34A, 34B, 34C only communicates with the polled chip 36A, 36B, 36C lying directly across from it. By way of example, polling circuit 34A communicates polling signal 56A to and receives response signal 58A from polled chip 36A. Polling circuit 34B communicates polling signal 56B to and receives response signal 58B from polled chip 36B, and so forth.

This example includes three polling circuits 34 that are in stacked alignment with three corresponding polled chips 36 on inner and outer surfaces 42, 44 of tire 26. It should be understood that alternative embodiments may include more than or less than three polling circuits 34 and three corresponding polled chips 36. For example, in some embodiments, polled chips 36 may be located in every groove 76 with a corresponding quantity of polling circuits 34 located at inner surface 42.

Figure 4:
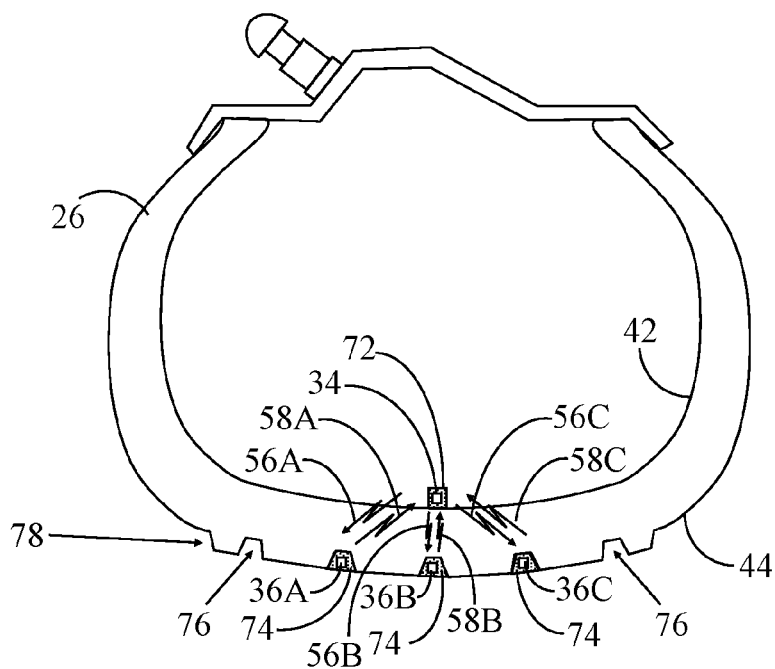
FIG. 4 shows a cross sectional view of a tire having a single polling circuit and multiple polled chips of the tread wear determination system in accordance with another embodiment.

FIG. 4 shows a cross sectional view of tire 26 having a single polling circuit 34 and multiple polled chips 36A, 36B, 36C of tread wear determination system 22 (FIG. 2) in accordance with another embodiment. Again, polling circuit 34 is embedded in housing 72, with housing 72 being coupled to inner surface 42 of tire 26. Each polled chip 36A, 36B, 36C also resides in housing 74, with housing 74 being coupled to outer surface 44 of tire 26 within grooves 76 in tread 78 of tire 26. In this configuration, polling circuit 34 may successively communicate with each polled chip 36A, 36B, 36C. For example, polling circuit 34 sequentially communicates polling signal 56A to and receives response signal 58A from polled chip 36A, then communicates polling signal 56B to and receives response signal 58B from polled chip 36B, and then communicates polling signal 56C to and receives response signal 58C from polled chip 36C.

Again, alternative embodiments may include more than or less than three polled chips 36. For example, in some embodiments, polled chips 36 may be located in every groove 76. In still other embodiments, there may be more than one polling circuit 34, where each polling circuit 34 successively communicates with a corresponding distinct set of multiple polled chips 36. Further, the polling of individual polled chips 36A, 36B, 36C by polling circuit 34 may be performed in a manner that is different from that which is described above.

Figure 5:
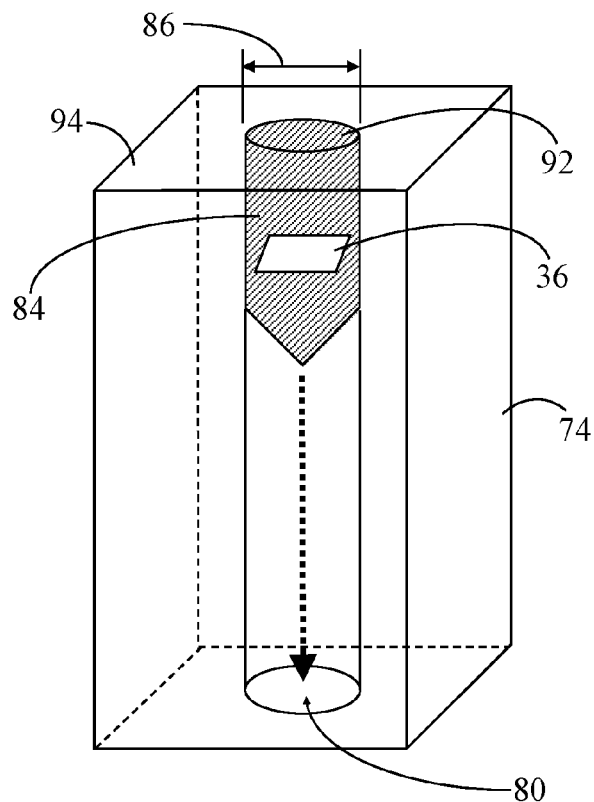
FIG. 5 shows a perspective view of the polled chip of either of FIGS. 3 and 4.
Figure 6:
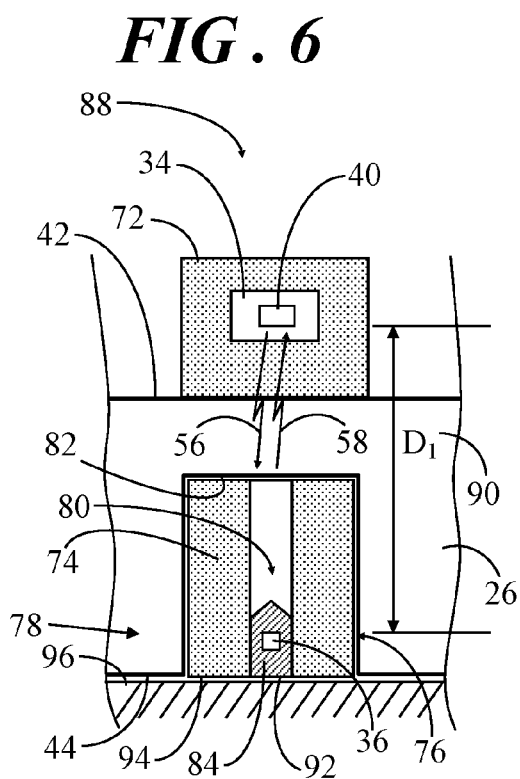
FIG. 6 shows a partial side sectional view of a polling circuit and a polled chip located at opposing surfaces of a tire.

Referring to FIGS. 5 and 6, FIG. 5 shows a perspective view of polled chip 36 of either of FIGS. 3 and 4 positioned in housing 74 and FIG. 6 shows a partial side sectional view of polling circuit 34 and polled chip 36 located at opposing inner and outer surfaces 42, 44 of tire 26. In FIG. 5, housing 74 is shown in a transparent form to reveal the interior structure of housing 74 and the location of polled chip 36 within housing 74.

Housing 74 is configured to reside in groove 76 of tread 78 of tire 26. In some embodiments, housing 74 may be formed from a rubber material, such as a vulcanized rubber material. Vulcanized rubber is rubber that is treated with, for example, sulfur or other equivalent curatives or accelerators during a vulcanization process. Vulcanization makes rubber more stable, tougher, and more resistant to heat making the rubber ideal for certain products such as tires. As will be discussed below, housing 74 is designed to wear down in concert with tread 78. By making housing 74 out of a material similar to that of tire 26, housing 74 will wear at a similar rate as tread 78.

Housing 74 has a slot 80 longitudinally extending through housing 74 toward a bottom 82 of groove 76, and polled chip 36 resides in slot 80. More particularly, polled chip 36 is embedded in an encapsulant material, such as a molding compound, to form a probe element 84. Probe element 84 has an outer dimension 86 (for example, an outer diameter) sized for a press fit into slot 80. In the example configuration, probe element 84 is generally cylindrical with a pointed tip facing bottom 82 of groove 76. Probe element 84 need not be cylindrical, but may instead by rectangular, octagonal, or any other suitable shape press fit into slot 80. Further, probe element 84 need not have a pointed tip. Instead, the end of probe element 84 facing bottom 82 of groove 76 may be concave, flat, convex, or any other suitable shape.

As particularly shown in FIG. 6, at an initial configuration 88, probe element 84 is positioned in slot 80 at a first distance 90, labeled $D_1$, displaced away from bottom 82 of groove 76 of tire 26. For example, a first end 92 of probe element 84 may be co-planar with an outer surface 94 of housing 74. As tire 26 rotates, tread 78, first end 92 of probe element 84 and outer surface 94 of housing 74 comes into contact with a surface, such as a roadway 96, upon which tire 26 is traveling. Repeated contact of tread 78 and outer surface 94 of housing 74 with roadway 96 will cause both tread 78 and outer surface 94 of housing 74 to wear down. The wearing of tread 78 and housing 74 pushes probe element 84 within slot 80 toward bottom 82 of groove 76. The movement of probe element 84, containing polled chip 36, influences the time delay between transmission of polling signal 56 from polling circuit 34 and receipt of response signal 58 at polling circuit 34. That is, as probe element 84 moves toward bottom 82 of groove 76, the time delay will decrease. The time delay is indicative of the distance between polling chip 40 in polling circuit 34 and polled chip 36, so the time delay can be used to characterize tread wear. These computations will be discussed in connection with FIGS. 8 and 9.

Figure 7:
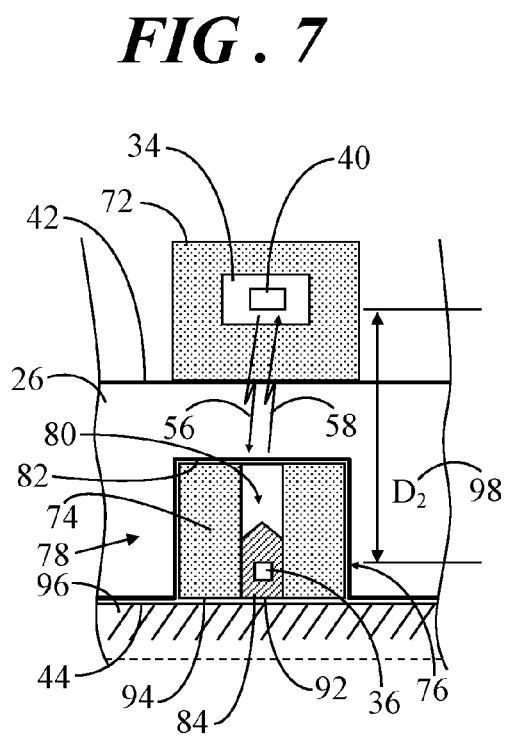
FIG. 7 shows a partial side sectional view of the location of the polled chip relative to the polling circuit in response to tread wear of the tire.

FIG. 7 shows a partial side sectional view of the location of polled chip 36 relative to polling circuit 34 in response to tread wear of tire 26. In FIG. 7, a dashed line represents the original amount, or depth, of tread 78 corresponding to FIG. 6. The space between the dashed line and outer surface 44 of tread 78 represents the amount of tread 78 that has worn away (i.e., the tread wear).

In response to the tread wear, probe element 84 has moved in slot 80 and is now located at a second distance 98, labeled $D_2$, displaced away from bottom 82 of groove 76 of tire 26. Due to tread wear, second distance 98 is less than first distance 90 (FIG. 6). This change from first distance 90 to second distance 98 is reflected in a decrease in the time delay between transmission of polling signal 56 from polling circuit 34 and receipt of response signal 58 at polling circuit 34. Again, these computations will be discussed in connection with FIGS. 8 and 9.

Figure 8:
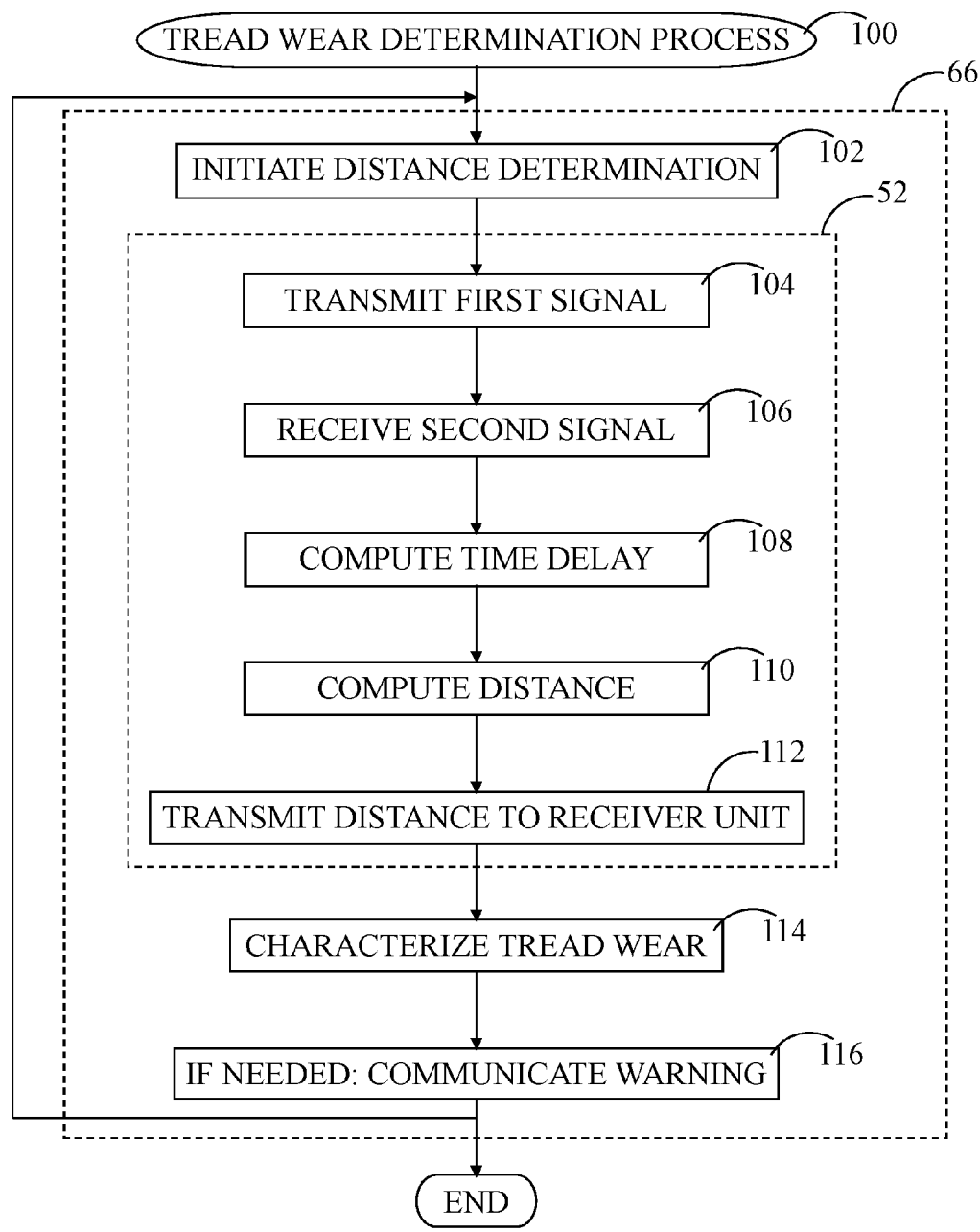
FIG. 8 shows a flowchart of a tread wear determination process in accordance with another embodiment.

Referring to FIGS. 2 and 8, FIG. 8 shows a flowchart of tread wear determination process 100 in accordance with another embodiment. In an example, tread wear determination process 100 details the operations performed through the execution of tread wear determination algorithm 66 at receiver unit 28 and execution of distance determination algorithm 52 at each measurement system 24 (as noted by dashed lines surrounding certain operational blocks of process 100). Advantageously, this polling and tread wear characterization can take place in real time while vehicle 20 (FIG. 1) is moving. For simplicity, the following description will entail the assessment of tread 78 on a single tire 26. It should be understood, however, that tread wear determination process 100 may be performed to concurrently characterize the tread wear of all tires 26 on vehicle 20.

At a block 102 of tread wear determination process 100, distance determination is initiated at measurement system 24. In some embodiments, receiver unit 28 may communicate command signal 68 to measurement system 24 at certain predetermined intervals. In response to command signal 68, polling circuit 34 may execute distance determination algorithm 52. In other embodiments, polling circuit 34 may periodically and automatically initiate distance determination at block 102.

At a block 104, polling circuit 34 transmits the first signal, i.e., polling signal 56, from polling chip 40 for receipt at polled chip 36. At a block 106, polling circuit 34 receives the second signal, i.e., response signal 58 including identifier 54, from polled chip 36. Again, polled chip 36 transmits response signal 58 in response to receipt of polling signal 56.

At a block 108, processor 46 (executing distance determination algorithm 52) computes the time delay between transmission of polling signal 56 from polling chip 40 and receipt of response signal 58 at polling chip 40. In response to computation of the time delay at block 108, processor 46 (executing distance determination algorithm 52) computes the distance between polling chip 40 and polled chip 36 in response to the time delay at a block 110. At a block 112, the computed distance (i.e., tread wear state signal 70) is transmitted to receiver unit 28.

At a block 114, controller 62 utilizes tread wear state signal 70 to characterize tread wear of tread 78 (FIG. 3) of tire 26 and at a block 116, controller communicates a warning via communication unit 30 if needed. Following block 116, process control loops back to block 102 in order to continuously monitor tread wear of tires 26 (FIG. 1).

It is to be understood that the process blocks depicted in FIG. 8 may be performed in parallel with each other or with performing other processes depending on the application. In addition, it is to be understood that the particular ordering of the process blocks depicted in FIG. 8 may be modified, while achieving substantially the same result. Accordingly, such modifications are intended to be included within the scope of the inventive subject matter.

Now referring briefly to FIG. 6, through the execution of tread wear determination process 100, a first time delay may be computed when polled chip 36 is in initial configuration 88 (for example, when tire 26 is first installed on vehicle 20). Thus, first distance 90 may be computed between polling chip 40 and polled chip 36 in response to the first time delay. Now referring briefly to FIG. 7, following movement of probe element 84 containing polled chip 36 in slot 80, a second time delay may be computed between transmission of polling signal 56 and response signal 58. In response to tread wear, the second time delay may be less than the first time delay. Thus, second distance 98 may be computed between polling chip 40 and polled chip 36 in response to the second time delay. Second distance 98 will be less than first distance 90 since the second time delay is less than the first time delay.

Figure 9:
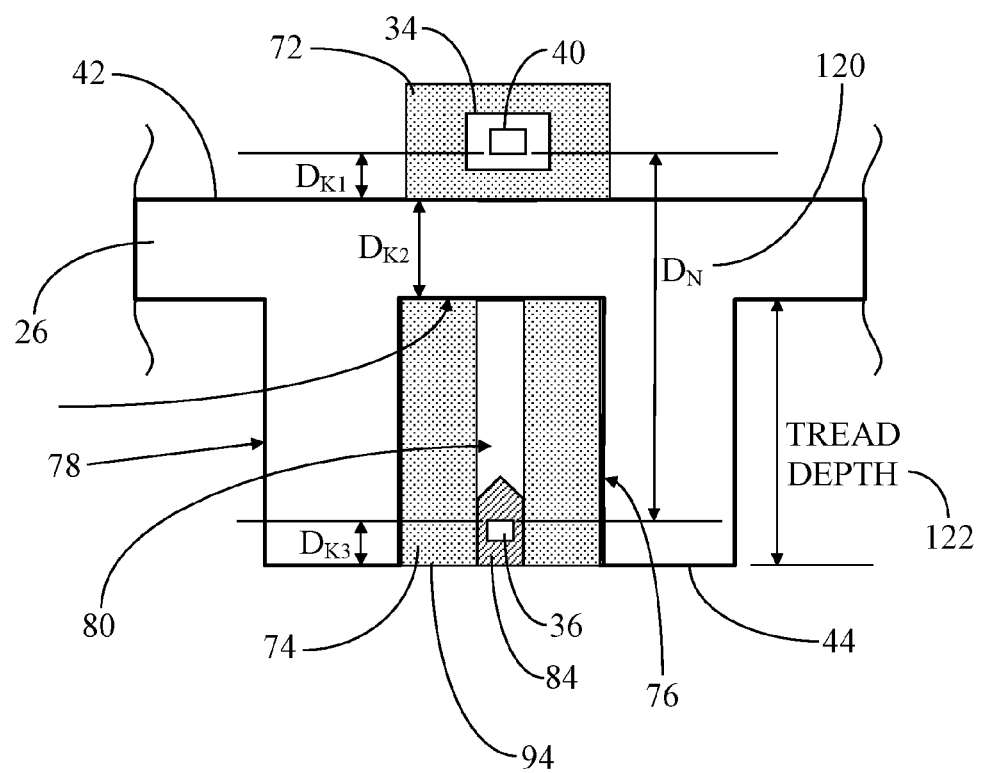
FIG. 9 shows a diagram of how a distance measured between the polling chip and the polled chip of FIG. 6 may be used to characterize tread wear in accordance with the tread wear determination process of FIG. 8.

FIG. 9 shows a diagram 118 of how a distance 120, labeled $D_N$, measured between polling chip 40 and polled chip 36 may be used to characterize tread wear in accordance with tread wear determination process 100 (FIG. 8). In this example, the time delay between transmission of polling signal 56 (FIG. 2) from polling chip 40 and receipt of polled signal 58 (FIG. 2) at polling chip 40 can be used to determine distance 120 between polling chip 40 and polled chip 36, as follows:

$$D_N = cT_{Delay} \quad (1)$$

In this example, $D_N$ is distance 120 between polling chip 40 in polling circuit 34 and polled chip 36 in probe element 84, c is the speed of light which is approximately $3.00 \times 10^8$ meters/second, and $T_{Delay}$ is the time delay between transmission of polling signal 56 from polling chip 40 of polling circuit 34 and receipt of response signal 58 at polling chip 40. A tread depth value 122 may be characterized as follows:

$$TREAD\ DEPTH = D_N - D_{K1} - D_{K2} + D_{K3} \quad (2)$$

In this example, TREAD DEPTH corresponds to the total distance between outer surface 44 of tread 78 and bottom 82 of groove 76 (i.e., tread depth value 122), $D_N$ is distance 120 computed using equation (1), $D_{K1}$ is a constant value corresponding to the distance between polling chip 40 within housing 72 and inner surface 42 of tire 26, $D_{K2}$ is a constant value corresponding to the base thickness of tire between inner surface 42 and bottom 82 of groove 76, and $D_{K3}$ is a constant value corresponding to the distance between polled chip 36 within probe element 84 and outer surface 94 of housing 74 which is aligned with outer surface 44 of tread 78. It can be readily observed from FIG. 9 that the various summations and subtractions shown in equation (2) leaves a remainder corresponding to tread depth value 122.

An example for determining tread depth value 122 is provided above for illustrative purposes. Those skilled in the art will recognize that due to the various constant values shown in equation (2), alternative embodiments may simply include a database (not shown) stored in memory 64 that associates tread depth values with distances 120. In still other embodiments, measurement system 24 may communicate the time delay to controller 62 so that controller 62 performs the related computations and/or accesses a database to determine tread depth value 122 directly from the time delay. Those skilled in the art will recognize that various other techniques may be implemented to determine tread wear based upon the time delay between transmission of polling signal 56 from polling chip 40 and receipt of response signal 58 from polled chip 36 at polling chip 40. Accordingly, these alternative techniques are intended to be included within the scope of the inventive subject matter.

In various embodiments, controller 62 may compare tread depth value 122 with a tread threshold value, i.e. a minimum allowable amount, for tread 78. If tread depth value 122 is less than the tread threshold value, controller 62 may alert the driver via communication unit 30 (FIG. 2). Additionally or alternatively, when there are multiple polled chips 36 per tire 26 as shown in FIGS. 3 and 4, controller 62 may compare tread depth values 122 for the single tire 26 to determine whether there is uneven wear across the single tire 26. Further, controller 62 may compare tread depth values 122 across the multiple tires 26 of vehicle 20 (FIG. 1) to determine whether tires 26 are wearing evenly or unevenly across all tires 26. Those skilled in the art will recognize that tread wear determination algorithm 66 (FIG. 2) may be suitably configured such that controller 62 can appropriately assess tread depth values 122 and characterize the amount and type of wear of tread 78 on each of tires 26. Thereafter, controller 62 can alert the driver of vehicle 20 regarding the tread wear via communication unit 30 (FIG. 2) so that the driver can replace, rotate, or repair the tires 26 and/or repair a mechanical issue with the suspension system before the tread 78 becomes excessively worn down.

Thus, a system and methodology for determining tread wear of vehicular tires is disclosed herein. An embodiment of a system for determining tread wear of a tire comprises a first wireless communication chip located at an inner surface of the tire, the first wireless communication chip being configured to transmit a first signal, and a second wireless communication chip located at an outer surface of the tire, the second wireless communication chip being configured to transmit a second signal in response to receipt of the first signal. The system further comprises a processor element associated with the first wireless communication chip, wherein the processor element is configured to compute a time delay between transmission of the first signal from the first wireless communication chip and receipt of the second signal at the first wireless communication chip, the time delay being indicative of the tread wear.

Another embodiment of a system for determining tread wear of tire comprises a first wireless communication chip embedded in a first housing, the first housing being coupled to an inner surface of the tire, the first wireless communication chip being configured to transmit a first signal, and a second housing located at an outer surface of the tire and configured to reside in a groove in a tread of the tire, the second housing having a slot longitudinally extending through the second housing toward a bottom of the groove. The system further comprises a second wireless communication chip residing in the slot, the second wireless communication chip being configured to transmit a second signal in response to receipt of the first signal, and a processor element associated with the first wireless communication chip, wherein the processor element is configured to compute a time delay between transmission of the first signal from the first wireless communication chip and receipt of the second signal at the first wireless communication chip, the time delay being indicative of the tread wear.

An embodiment of a method comprises transmitting a first signal from a first wireless communication chip located at an inner surface of a tire, receiving said first signal at a second wireless communication chip located at an outer surface of said tire, transmitting a second signal from said second wireless communication chip in response to receipt of said first signal, receiving said second signal at said first wireless communication chip, computing a time delay between transmission of said first signal and receipt of said second signal, and determining tread wear of said tire in response to said time delay.

Accordingly, the system and process, discussed above, enable determination of the tread wear of the tires on a vehicle. More particularly, the inventive concepts and principles embodied in the system and method enable real time, automatic, and wireless measurement and characterization of the tread wear of the tires. Accordingly, a driver can be alerted to changes in tread depth and can therefore get replacement tires before a legal minimum safe tread depth is reached. Additionally, individual variations of tread depth between tires and/or between individual grooves in the tread of a tire can be measured and characterized to identify when the tires may need to be rotated and/or when there may be a problem that is causing undue wear in the tread of one tire versus the remaining tires.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system for determining tread wear of a tire comprising:
    a first wireless communication chip located at an inner surface of said tire, said first wireless communication chip being configured to transmit a first signal;
    a second wireless communication chip located at an outer surface of said tire, said second wireless communication chip being configured to transmit a second signal in response to receipt of said first signal; and
    a processor element associated with said first wireless communication chip, wherein said processor element is configured to compute a time delay between transmission of said first signal from said first wireless communication chip and receipt of said second signal at said first wireless communication chip, said time delay being indicative of said tread wear.

2. The system of claim 1 wherein said first wireless communication chip is embedded in a housing, said housing being coupled to said inner surface of said tire.

3. The system of claim 1 further comprising a housing configured to reside in a groove in a tread of said tire, said housing having a slot longitudinally extending through said housing toward a bottom of said groove, wherein said second wireless communication chip resides in said slot.

4. The system of claim 3 wherein said housing is a rubber material.

5. The system of claim 3 wherein said housing is a vulcanized rubber material.

6. The system of claim 3 wherein said second wireless communication chip is embedded in an encapsulant to form a probe element configured to be press fit into said slot.

7. The system of claim 6 wherein at an initial configuration, said probe element is displaced away from said bottom of said groove, and said probe element moves in said slot toward said bottom of said groove in response to said tread wear to thereby influence said time delay.

8. The system of claim 7 wherein at said initial configuration, said time delay is a first time delay, following movement of said probe element in said slot toward said bottom of said groove, said time delay is a second time delay, said second time delay being less than said first time delay, and wherein:
    said processor element is configured to compute a first distance between said first and second wireless communication chips in response to said first time delay; and
    said processor element is configured to compute a second distance between said first and second wireless communication chips in response to said second time delay, said second distance being less than said first distance, wherein a difference between said first and second distances characterizes a magnitude of said tread wear.

9. The system of claim 1 wherein said first and second wireless communication chips are in stacked alignment with one another on said inner and outer surfaces of said tire.

10. The system of claim 9 wherein said system further comprises:
a third wireless communication chip located at said inner surface of said tire, said third wireless communication chip being configured to transmit a third signal;
a fourth wireless communication chip located at said outer surface of said tire, said third and fourth wireless communication chips being in stacked alignment with one another on said inner and outer surfaces of said tire, said fourth wireless communication chip being configured to transmit a fourth signal in response to receipt of said third signal; and
a second processor element associated with said third wireless communication chip, wherein said second processor element is configured to compute a second time delay between transmission of said third signal from said third wireless communication chip and receipt of said fourth signal at said third wireless communication chip, said second time delay being indicative of said tread wear.

11. The system of claim 1 further comprising a third wireless communication chip located at said outer surface of said tire, said third wireless communication chip being configured to transmit a third signal in response to receipt of said first signal, and said processor element is configured to compute a second time delay between transmission of said first signal from said first wireless communication chip and receipt of said third signal at said first wireless communication chip, said second time delay being indicative of said tread wear.

12. The system of claim 1 further comprising:
a receiver unit in wireless communication with said processor element, said receiver unit being configured to receive a tread wear state signal from said processor element, said tread wear state signal being indicative of said tread wear; and
a communication unit coupled with said receiver unit, said communication unit being configured to provide information to a user regarding said tread wear of said tire.

13. The system of claim 1 wherein a vehicle includes a plurality of tires, said tire being one of said plurality of tires, and each of said plurality of tires includes said first wireless communication chip, said second wireless communication chip, and said processor element such that said tread wear is determined for said each of said plurality of tires.

14. A system for determining tread wear of tire comprising:
a first wireless communication chip embedded in a first housing, said first housing being coupled to an inner surface of said tire, said first wireless communication chip being configured to transmit a first signal;
a second housing located at an outer surface of said tire and configured to reside in a groove in a tread of said tire, said second housing having a slot longitudinally extending through said second housing toward a bottom of said groove;
a second wireless communication chip residing in said slot, said second wireless communication chip being configured to transmit a second signal in response to receipt of said first signal; and
a processor element associated with said first wireless communication chip, wherein said processor element is configured to compute a time delay between transmission of said first signal from said first wireless communication chip and receipt of said second signal at said first wireless communication chip, said time delay being indicative of said tread wear.

15. The system of claim 14 wherein said second wireless communication chip is embedded in an encapsulant to form a probe element configured to be press fit into said slot, and wherein at an initial configuration, said probe element is displaced away from said bottom of said groove, and said probe element moves in said slot toward said bottom of said groove in response to said tread wear to thereby influence said time delay.

16. The system of claim 15 wherein at said initial configuration, said time delay is a first time delay, following movement of said probe element in said slot toward said bottom of said groove, said time delay is a second time delay, said second time delay being less than said first time delay, and wherein:
said processor element is configured to compute a first distance between said first and second wireless communication chips in response to said first time delay; and
said processor element is configured to compute a second distance between said first and second wireless communication chips in response to said second time delay, said second distance being less than said first distance, wherein a difference between said first and second distances characterizes a magnitude of said tread wear.

17. The system of claim 14 wherein:
said first and second wireless communication chips are in stacked alignment with one another on said inner and outer surfaces of said tire; and
said system further comprises:
a third wireless communication chip located at said inner surface of said tire, said third wireless communication chip being configured to transmit a third signal;
a fourth wireless communication chip located at said outer surface of said tire, said third and fourth wireless communication chips being in stacked alignment with one another on said inner and outer surfaces of said tire, said fourth wireless communication chip being configured to transmit a fourth signal in response to receipt of said third signal; and
a second processor element associated with said third wireless communication chip, wherein said second processor element is configured to compute a second time delay between transmission of said third signal from said third wireless communication chip and receipt of said fourth signal at said third wireless communication chip, said second time delay being indicative of said tread wear.

18. The system of claim 14 further comprising a third wireless communication chip located at said outer surface of said tire, said third wireless communication chip being configured to transmit a third signal in response to receipt of said first signal, and said processor element is configured to compute a second time delay between transmission of said first signal from said first wireless communication chip and receipt of said third signal at said first wireless communication chip, said second time delay being indicative of said tread wear.

19. A method comprising:
transmitting a first signal from a first wireless communication chip located at an inner surface of a tire;
receiving said first signal at a second wireless communication chip located at an outer surface of said tire;

transmitting a second signal from said second wireless communication chip in response to receipt of said first signal;

receiving said second signal at said first wireless communication chip;

computing a time delay between transmission of said first signal and receipt of said second signal; and determining tread wear of said tire in response to said time delay.

20. The method of claim 19 wherein said second wireless communication chip resides in a slot extending through a housing, said housing resides in a groove in a tread of said tire, said slot extends through said housing toward a bottom of said groove, said second wireless communication chip is displaced away from said bottom of said groove at an initial configuration, said second wireless communication chip is configured to move in said slot toward said bottom of said groove in response to said tread wear, and said method further comprises:

performing said computing said time delay when said second wireless communication chip is in said initial configuration, said time delay being a first time delay;

computing a first distance between said first and second wireless communication chips in response to said first time delay;

following movement of said second wireless communication chip in said slot, computing a second time delay between transmission of said first signal and receipt of said second signal, said second time delay being less than said first time delay;

computing a second distance between said first and second wireless communication chips in response to said first time delay, said second distance being less than said first distance; and characterizing a magnitude of said tread wear in response to a difference between said first and second distances.

\* \* \* \* \*